July 21, 1964 — N. H. SCHEARER — 3,141,567
CLOSURE MEMBER
Filed March 28, 1962
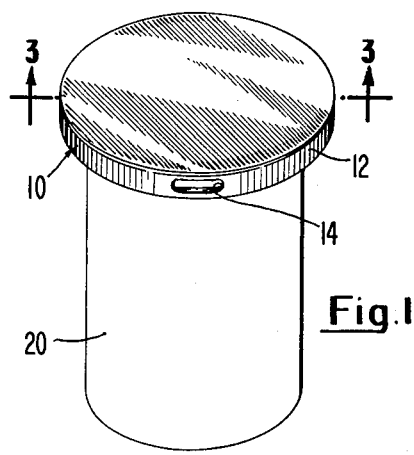
Fig.1
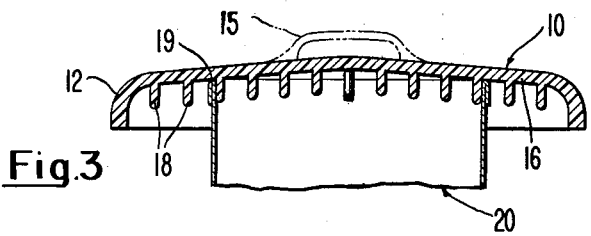
Fig.3
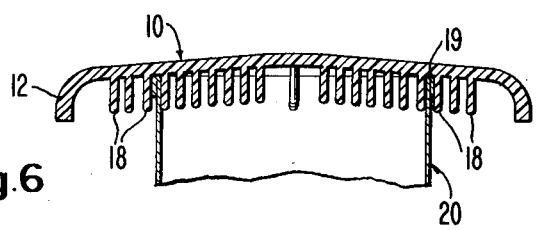
Fig.6
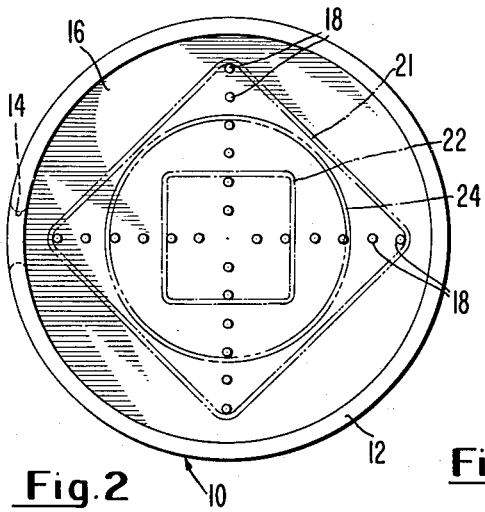
Fig.2
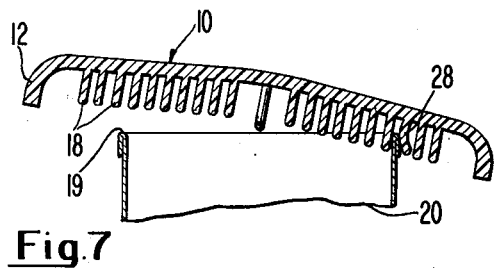
Fig.7
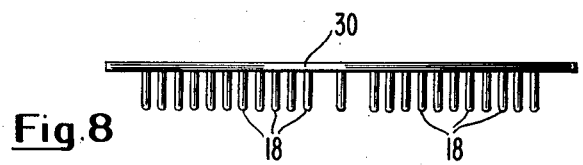
Fig.8
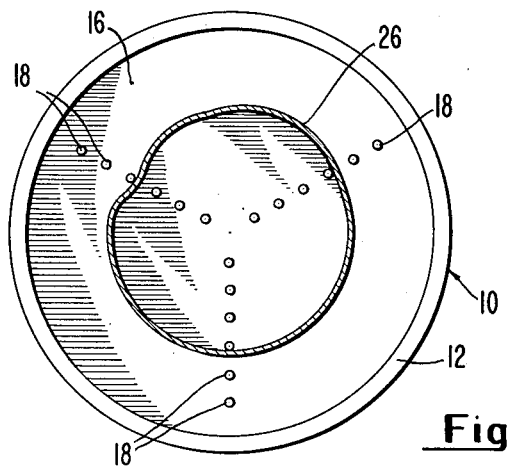
Fig.4
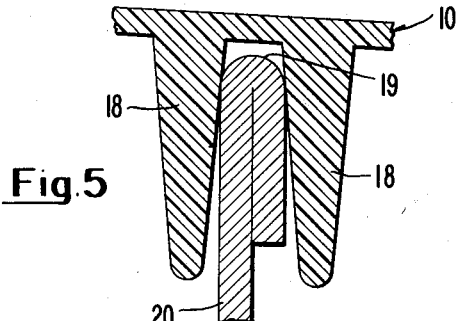
Fig.5
INVENTOR.
NED H. SCHEARER
BY
AGENT

3,141,567
CLOSURE MEMBER
Ned H. Schearer, 418 N. Eagle Road, Havertown, Pa.
Filed Mar. 28, 1962, Ser. No. 183,307
5 Claims. (Cl. 220—24)

This invention hereinafter described and claimed has to do with closure members, but more specifically to closures particularly useful as container covers or lids.

In many municipalities the law requires that trash and garbage cans or containers be kept covered. The handling of such containers by collectors is pretty rough, and even newly purchased cans are soon out of shape, with the result that their covers or lids no longer fit. In spite of this, some feeble efforts are made to comply with the law by placing the lids loosely on the cans but they are easily knocked off by a dog or other animal in search of some edible morsel in the cans, thus creating an unsightly, but more importantly, an unhealthy situation sometimes resulting in the spread of disease. These conditions are particularly prevalent in business areas where numerous restaurants and cafes are located.

The present invention has as its object to overcome this unhealthy and unsavory condition by providing a closure member or lid adapted to fit containers of various sizes and shapes whether regular or irregular.

In accordance with this object and first briefly described the invention comprises a closure or lid having a plurality of fingers extending downwardly from its underside, preferably, but not necessarily, in radial rows.

In the drawings:

FIG. 1 is a perspective view of a container having a lid in accordance with the present invention positioned thereon;

FIG. 2 is a bottom plan view of the lid showing radially arranged rows of fingers and how they fit over and secure the lid to variously shaped cans shown in broken lines;

FIG. 3 is a sectional view taken along the line 3—3 of FIG. 1;

FIG. 4 is a view similar to FIG. 2 but showing a different arrangement of fingers and how they fit over a can of irregular shape shown in broken lines;

FIG. 5 is an enlarged sectional view of a fragmentary portion of the lid showing details of two of the fingers;

FIG. 6 is a view similar to FIG. 3 but showing elongated rigid fingers;

FIG. 7 is a view similar to FIG. 3 but showing elongated flexible fingers; and

FIG. 8 is a side view of a modified form of the invention.

Now more specifically and in accordance with the preferred illustrated embodiment of the invention, it is seen to comprise an inverted pan shaped body member 10 having a depending peripheral flange 12. While the lid is shown somewhat dome-shaped it will be understood that this is by way of preference and that it could assume other shapes such as a high dome or even flat like a cake pan. Handle means may be provided by an aperture 14 through the flange 12 or in the usual manner as shown in broken lines at 15, or both.

In particular accordance with the present invention, the underside 16 of the lid is provided with a plurality of depending fingers 18. Preferably, but not necessarily, as seen in FIGS. 2 and 4, the fingers are formed in radial rows, those in each row being spaced from each other a distance sufficient to permit entry therebetween of the top edge 19 of a can 20. This spacing may be such as to effect gripping of the can rim by fingers in each row—one on each side, as seen in FIG. 5—or just by one, either on the outside of the rim, as shown in broken lines on FIGS. 2 and 3, or on the inside, or both, as seen in FIG. 4.

The fingers may be otherwise provided but have been shown in FIG. 5 as being molded integrally with the lid and of suitable material, such as plastic. While the fingers have been shown rather long and tapered in this figure, it will be understood that they can be shaped differently, straight sided and shorter, for example. They may be rigidly formed—as shown in FIG. 6—but it is preferred to have them slightly flexible so they can more readily adapt themselves to a particular container.

As shown by broken lines in FIGS. 2 and 4 the closure will fit a multiplicity of can or container sizes and shapes of which the major dimension falls within the inner diameter of flange 12. For example, FIG. 2 shows a square can 21 with its corners engaged by the fingers, a smaller square can 22 with its sides engaged by the fingers, and a round can 24 with its rim engaged by the fingers, also see FIG. 1.

As mentioned above the fingers make it possible for the lid to be secured to cans which have been battered—or otherwise formed—into irregular shapes. This condition is illustrated by the can outline 26 in FIG. 4, and while this figure shows only three radial rows of fingers, those with other finger arrangements are equally effective.

With rigid fingers, as shown in FIG. 6 it is necessary to remove the lid with a bodily vertical motion, otherwise the fingers would bind against the can rim and grip it even tighter, thus animals are prevented from removing the cover by tipping one side.

Even with flexible fingers, when of sufficient length, as seen in FIG. 7, it is more difficult to remove the lid by tilting it, as the fingers on the opposite side tend to bind against the can rim, as seen at 28.

If desired the peripheral flange 12 may be omitted, and the lid formed as a flat or planar body member 30, as shown in FIG. 8.

Having described the preferred embodiment of the invention and some of its variations, it will now be understood that it provides a closure or lid adapted for use on containers of various sizes, shapes and conditions.

What is claimed is:
1. A closure comprising:
 (a) a body member having upper and lower surfaces; and
 (b) a plurality of radially spaced fingers depending from the said lower surface and arranged in a manner permitting entry of the rim of individual containers of a wide variety of sizes and shapes between a plurality of pairs of adjacent fingers.
2. A closure according to claim 1 wherein said fingers are arranged in radial rows from the center of the lower side of said body member.
3. A closure comprising:
 (a) a pan-shaped body member having upper and lower surfaces surrounded by a depending peripheral flange; and
(b) a plurality of radially spaced fingers depending from the said lower surface and arranged in a manner permitting entry of the rim of individual containers of a wide variety of sizes and shapes between a plurality of pairs of adjacent fingers.

4. A closure according to claim 3 wherein said fingers are arranged in a plurality of radial rows from the center of the lower side of said body member.

5. A closure according to claim 3 wherein said fingers are formed integrally with said member in radially arranged rows.

References Cited in the file of this patent

UNITED STATES PATENTS

| | | |
|---|---|---|
| 893,469 | Essmuller | July 14, 1908 |
| 1,441,712 | Picard | Jan. 9, 1923 |
| 3,069,040 | Corsette | Dec. 18, 1962 |
| 3,096,903 | Grant | July 9, 1963 |

FOREIGN PATENTS

| | | |
|---|---|---|
| 739,533 | Great Britain | Nov. 2, 1955 |